(12) United States Patent
Nakamura et al.

(10) Patent No.: US 8,280,665 B2
(45) Date of Patent: Oct. 2, 2012

(54) CALIBRATION DEVICE FOR ON-VEHICLE CAMERA

(75) Inventors: Yoshihiro Nakamura, Nagoya (JP); Etsuo Yamada, Nagoya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 411 days.

(21) Appl. No.: 12/552,694

(22) Filed: Sep. 2, 2009

(65) Prior Publication Data

US 2010/0082281 A1    Apr. 1, 2010

(30) Foreign Application Priority Data

Sep. 30, 2008 (JP) ................................. 2008-253258

(51) Int. Cl.
*G01C 17/38* (2006.01)
*G06K 9/32* (2006.01)

(52) U.S. Cl. .......................................... 702/95; 382/293

(58) Field of Classification Search .................... 702/95, 702/85, 94, 97, 127, 150–153, 155–158, 702/166, 182–183, 189; 382/104, 106, 154, 382/181, 190, 199, 206, 216, 224, 276, 286, 382/291, 293, 295; 348/135, 137, 142, 148, 348/207.99

See application file for complete search history.

(56) References Cited

U.S. PATENT DOCUMENTS

| | | | |
|---|---|---|---|
| 5,940,531 A | 8/1999 | Watanabe et al. | |
| 6,118,552 A | 9/2000 | Suzuki et al. | |
| 6,137,893 A | 10/2000 | Michael et al. | |
| 6,256,411 B1 | 7/2001 | Iida | |
| 6,813,371 B2 * | 11/2004 | Kakinami | 382/104 |
| 7,423,666 B2 | 9/2008 | Sakakibara et al. | |
| 2003/0137510 A1 | 7/2003 | Massen | |
| 2008/0031514 A1 | 2/2008 | Kakinami | |
| 2008/0101693 A1 | 5/2008 | Young et al. | |
| 2011/0102581 A1 * | 5/2011 | Nakamura et al. | 348/135 |

FOREIGN PATENT DOCUMENTS

| | | |
|---|---|---|
| JP | 08-161508 A | 6/1996 |
| JP | 09-153139 A | 6/1997 |
| JP | 2002-354506 A | 12/2002 |

(Continued)

OTHER PUBLICATIONS

Notification of Transmittal of Translation of the International Preliminary Report on Patentability dated Mar. 17, 2011 in corresponding PCT/JP2009/062977, the international stage of co-pending U.S. Appl. No. 13/001,061.

European Search Report dated Aug. 5, 2011, issued in corresponding European Patent Application No. 09804866, which corresponds to copending U.S. Appl. No. 13/001,061.

(Continued)

*Primary Examiner* — Toan M Le
(74) *Attorney, Agent, or Firm* — Sughrue Mion, PLLC

(57) ABSTRACT

A calibration device for an on-vehicle camera includes an image receiving portion receiving an image of an area around a vehicle taken by an on-vehicle camera, a viewpoint transformation portion performing a viewpoint transformation on the image to obtain a transformed image, a region setting portion setting a recognition target region on the transformed image according to coordinates of the calibration index set in accordance with vehicle models, where the recognition target region includes therein the calibration index, a calibration point detecting portion detecting a calibration point positioned within the calibration index included in the recognition target region, and a calibration calculating portion calibrating the on-vehicle camera in accordance with coordinates of the calibration point in a reference coordinate system and in accordance with coordinates of the calibration point in a camera coordinate system.

12 Claims, 8 Drawing Sheets

FOREIGN PATENT DOCUMENTS

| | | |
|---|---|---|
| JP | 2005-016979 A | 1/2005 |
| JP | 2006-162442 A | 6/2006 |
| JP | 2007-225809 A | 9/2007 |
| JP | 2008-131177 A | 6/2008 |
| JP | 2008-131250 A | 6/2008 |

OTHER PUBLICATIONS

International Search Report issued in PCT/JP2009/062977 dated Oct. 27, 2009 in copending case.

Co-pending U.S. Appl. No. 13/001,061, filed Dec. 23, 2010.

* cited by examiner

CALIBRATION DEVICE FOR ON-VEHICLE CAMERA

CROSS REFERENCE TO RELATED APPLICATIONS

This application is based on and claims priority under 35 U.S.C. §119 to Japanese Patent Application 2008-253258, filed on Sep. 30, 2008, the entire content of which is incorporated herein by reference.

FIELD OF THE INVENTION

The present invention relates to a calibration device for an on-vehicle camera, for calibrating an on-vehicle camera.

BACKGROUND

Recently, an increasing number of vehicles are provided with a camera for taking images of lateral or rear areas of the vehicle so that a driver can visually recognize the images displayed on a screen provided inside the vehicle. Further, a system or a device that performs an image processing on the image taken by the camera for assisting a driving maneuver, such as parking, is developed. In particular, the camera requires a highly precise calibration, including adjustment of an optical axis. This is because the image taken by the camera serves as a base to generate information necessary for positioning of the vehicle. For example, JP2008-131250A (Reference 1) discloses a technology of calibration of an on-vehicle camera. According to Reference 1, the on-board camera takes an image of a marker (a calibration index) that is positioned at two points within a vision range of the on-board camera and has a black and white checkered pattern. The image processing is performed on the image taken by the on-board camera to detect a center point (a calibration point) of the marker.

The on-vehicle camera is calibrated when mounted on a vehicle in a vehicle assembly plant or the like so as to absorb an installation error. The on-vehicle camera is also calibrated in a repair shop or the like to adjust misalignment caused by accumulated vibration or impact due to travel of the vehicle. Commonly, the calibration of the camera is performed in a state where the vehicle is parked in a predetermined position. To park the vehicle in a correct position, the vehicle may be driven forward or backward until the wheels of the vehicle are stopped by a wheel stopper or a groove for accommodating the wheels.

In order to accurately calibrate the camera, it is inevitable to accurately park the vehicle in the predetermined position. In the vehicle assembly plant or the repair shop, a front end of the vehicle is detected by a phototube to have the vehicle parked with a high accuracy. In the meantime, the camera may be mounted on various vehicle models. Since an overall vehicle length varies depending on the vehicle models, a distance between the camera and the marker also varies when the vehicle is parked in a manner that the front end of the vehicle is aligned with a base line provided on the floor. When two vehicles having different overall vehicle lengths are parked in the manner that the front ends thereof are aligned with the base line, a distance between the marker and one vehicle differs from a distance between the marker and the other vehicle. Because of the difference in the distance, an image including the marker and taken by the camera mounted on the one vehicle differs from an image including the marker and taken by the camera mounted on the other vehicle even though the marker is the same. To detect a calibration point, an image processing is performed on a capture region obtained by cutting a part of the image in order to reduce a calculation load for the image processing. When the distance between the vehicle and the marker is shorter, the marker appears larger on the image, accordingly, an area of the capture region is larger. On the other hand, when the distance between the vehicle and the camera is longer, the marker appears smaller on the image, accordingly, the area of the capture region is smaller.

In addition to the difference in a horizontal distance between the vehicle and the marker, a difference in an installation height of the camera varies depending on the vehicle models, which leads to the difference in how the marker appears on the image. This is because a vehicle height varies depending on the vehicle models, and thus the installation height of the camera is not uniformly specified. When the vehicle is parked on a basis of a rear end thereof instead of the front end, an installation position or a direction of the optical axis of the camera varies depending on the vehicle models because the vehicle height or an angle of a rear panel of the vehicle differ depending on the vehicle models.

Since a position of the marker on the image varies depending on the vehicle model as described above, the capture region needs to be set in a calibration device for each vehicle model. Also, size, a shape or the position of the marker on the image varies depending on the position of the marker on the image, and thus the number of pixels contained in the capture region varies. In other words, the area or the position of the capture region defined on the image is affected and changed by three-dimensional factors related to the changes in the height of the camera, in an angle of the optical axis of the camera and in the distance between the marker and the vehicle. Consequently, the image processing (an image processing program) for detecting the calibration point requires an appropriate tuning for each vehicle model, thereby increasing complexity of software. That is, the use of the software that requires the appropriate tuning for each vehicle model leads to complicated maintenance procedures or quality management of the software. Further, a detection performance of the calibration point is affected by the changes in the area of the capture region, making it difficult to obtain stable detection accuracy. However, when the position of the marker is changed for each vehicle model in order to set the same capture region, settings made in the vehicle assembly plant need to be changed for each vehicle model, thereby considerably decreasing productivity.

A need thus exists for a calibration device for an on-vehicle camera, which is not susceptible to the drawback mentioned above.

SUMMARY OF THE INVENTION

According to an aspect of the present invention, a calibration device for an on-vehicle camera includes an image receiving portion receiving an image of an area around a vehicle taken by an on-vehicle camera mounted on the vehicle, where the on-vehicle camera has an imaging range that includes therein a calibration index placed on a floor surface, a viewpoint transformation portion performing a viewpoint transformation on the image to obtain a transformed image, where the transformed image is obtained by viewing the image from a direction that is perpendicular to the floor surface, a region setting portion setting a recognition target region on the transformed image according to coordinates of the calibration index set in accordance with vehicle models on which the on-vehicle camera is mounted, where the recognition target region includes therein the calibration index, a calibration point detecting portion detecting a calibration point positioned within the calibration index included in the recognition target region, and a calibration calculating portion calibrating the on-vehicle camera in accordance with coordinates of the calibration point in a reference coordinate system and in accordance with coordinates of the calibration point in a camera coordinate system, where the coordinates of the calibration point in the reference coordinate system show a position of the calibration point in space and the coordinates of the calibration point in the camera coordinate system show the position of the calibration point detected in the transformed image.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
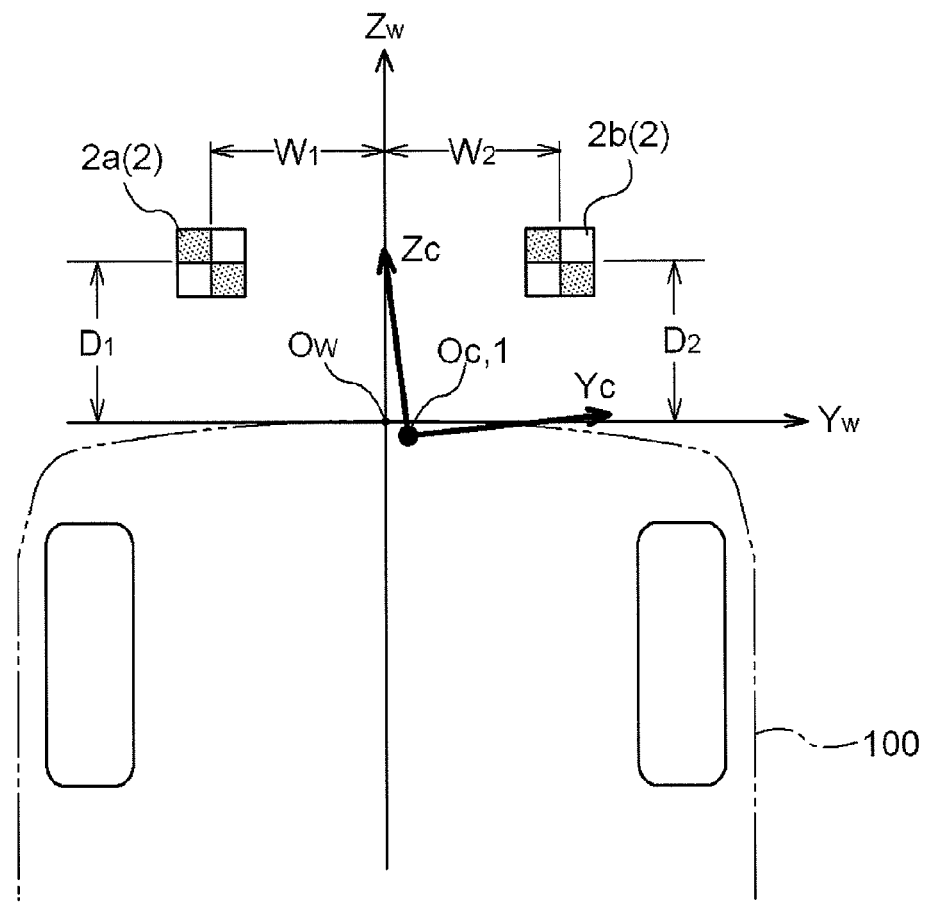
FIG. 1 shows positional relationship of markers for calibration and a vehicle.

An embodiment of the present invention will be explained with reference to the illustrations as follows. As shown in FIG. 1, a camera 1 (an on-vehicle camera 1) is mounted, in a laterally off-set manner from a longitudinal axis of a vehicle 100, above a license plate attached to a rear portion of the vehicle 100 so that an optical axis of the camera 1 faces downward (for example, 30 degrees downward relative to a line parallel to the vehicle 1). The camera 1 may be mounted on the lateral center of the vehicle 100. In this embodiment shown in FIG. 1, the longitudinal axis of the vehicle 100 and the optical axis of the camera 1 are nonparallel. The camera 1 is, for example, a wide angle camera having a field of vision of 110 degrees to 120 degrees in a lateral direction and is able to take an image of a rear area of the vehicle 100 up to 8 meters from the vehicle 100. The camera 1 is calibrated when mounted on the vehicle 100 in a vehicle assembly plant or the like so as to absorb an installation error. The camera 1 is also calibrated in a repair shop or the like to adjust misalignment caused by accumulated vibration or impact due to travel of the vehicle 100. An example of calibration of the camera 1 conducted in the vehicle assembly plant will be described hereunder.

As shown in FIG. 1, the calibration of the camera 1 is performed in a state where the vehicle 100 is parked in a predetermined position. To park the vehicle 100 in a correct position, the vehicle 100 may be driven forward or backward until the wheels of the vehicle 100 are stopped by a wheel stopper or a groove for accommodating the wheels. According to the example shown in FIG. 1, two markers 2, 2 (2a, 2b) serving as two calibration indexes 2, 2 are placed on a floor surface so as to be coplanarly aligned with the floor surface. As shown in FIG. 1, a distance between the two markers 2a, 2b is set to be narrower than a tread width of the vehicle 100 to prevent the wheels of the vehicle 100 from running over the two markers 2a, 2b. Alternatively, the distance between the two markers 2a, 2b may be set to be wider than the tread width of the vehicle 100 to prevent the wheels of the vehicle 100 from running over the two markers 2a, 2b.

In FIG. 1, the vehicle 100 is parked so that the floor surface located under the lateral center of an end portion of the vehicle 100 corresponds to an origin Ow of a world coordinate system (a reference coordinate system, Xw, Yw, Zw). Here, each axis of the world coordinate system and each corresponding axis of a camera coordinate system (Xc, Yc, Yc) are nonparallel. The world coordinate system and the camera coordinate system are a right-handed coordinate system. In FIG. 1, neither an Xw axis that is perpendicular to the paper surface on which FIG. 1 is drawn nor an Xc axis that is substantially perpendicular to the paper surface on which FIG. 1 is drawn is shown. A coordinate transformation between the world coordinate system and the camera coordinate system is performed by using a well-known arithmetic operation disclosed, for example, in JP2008-131250A (Reference 1).

Figure 2:
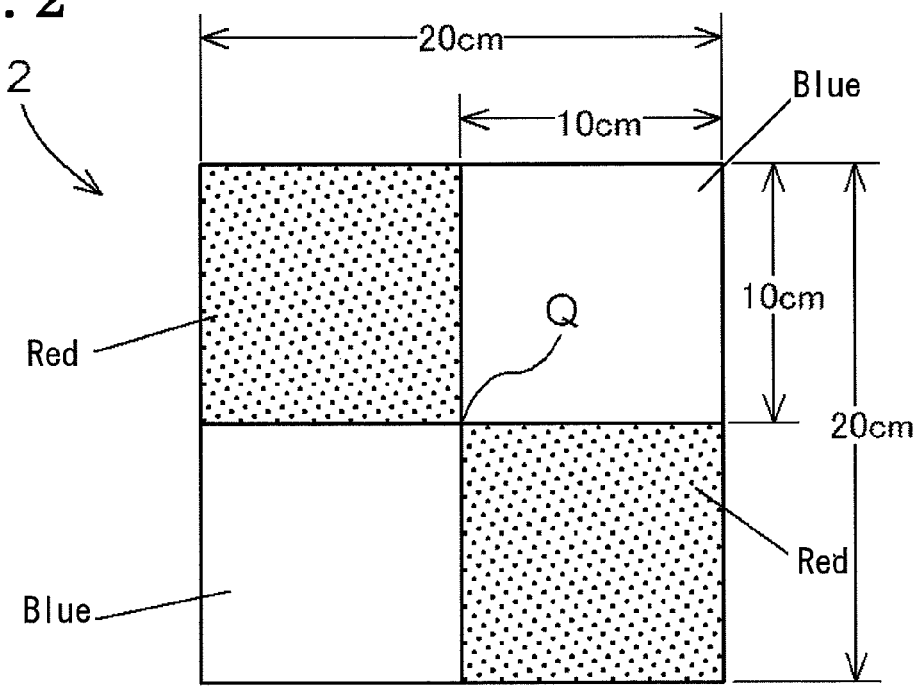
FIG. 2 shows the marker for the calibration.

The marker 2 is provided in at least two positions within a vision range of the camera 1. The marker 2 is positioned so that coordinates of the marker 2 are known in the world coordinate system. As shown in FIG. 2, the marker 2 includes a checkered (plaid) blue and red pattern in this embodiment. An intersecting point of boundaries defining checks, that is, a calibration point Q positioned in a center of the pattern, serves as a reference point for the calibration of the camera 1. In other words, the marker 2 is positioned so that coordinates of the calibration point Q are known in the world coordinate system. In this embodiment, the marker 2 includes four rectangles, that is two blue rectangles and two red rectangles. However, the number of rectangles is not limited to four and the marker 2 may include other pattern. Further, the marker 2 may include black and white rectangles instead of red and blue ones. In this embodiment, the marker 2 includes the red rectangles and the blue rectangles aiming for a good recognition effect by use of a red component and a blue component, which are extreme opposite components to each other from a standpoint of an image signal and are applied to many on-vehicle cameras.

The marker 2 is placed directly or indirectly on the floor that is exposed to environmental lights such as the light of fluorescent lamps or light sunrays incoming from windows. The indirect placement means that the marker 2 is placed on a base or a pedestal provided on the floor. In either case, image recognition may be difficult depending on conditions of reflection of the environmental lights. Therefore, a coating method where satin coating is applied twice on an iron plate is used in this embodiment, so that the surface of the marker 2 has a frosted surface appearance, and thus an image is obtained without less influence of the reflection.

In the example shown in FIG. 1, the two markers 2, 2 are provided on the floor in a left-right symmetry manner relative to a longitudinal axis of the vehicle 100, that is, relative to a Zw axis of the world coordinate system (D1=D2 and W1=W2). However, the two markers 2, 2 may be arranged in other manners as long as the markers 2, 2 are within the vision range of the camera 1 and the coordinates of the calibration point Q of each marker 2 are known. That is, arbitrary arrangement of the markers 2, 2 may be applied depending on a space available or a relationship with other facilities provided in the plant as long as the coordinates of the calibration point Q are known in the world coordinate system.

The dimensions of the marker 2 is appropriately set based on resolution of the camera 1, performance for processing the image taken by the camera 1, the positions of the markers 2, 2 or the like so that the calibration point Q is accurately detected. As an example, each side of the rectangle may be 10 centimeters to 15 centimeters, that is, each side of the marker 2 may be 20 centimeters to 30 centimeters when D1 and D2 are both 1 to 2 meters and W1 and W2 are both approximately 0.5 meter.

Figure 3:
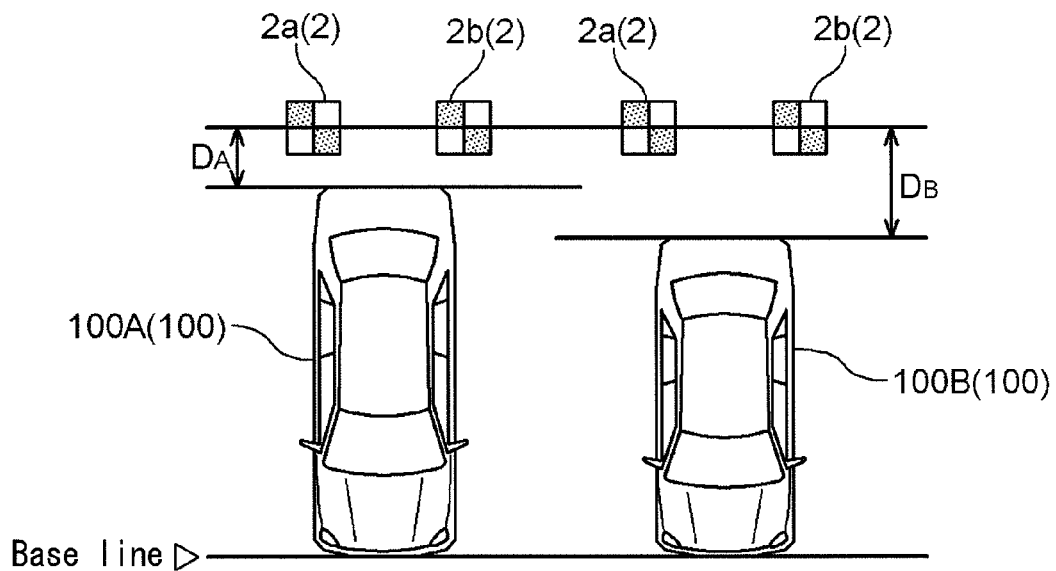
FIG. 3 shows positions of the vehicles having different overall vehicle lengths when parked with the front ends thereof aligned and positions of the markers.
Figure 4A:
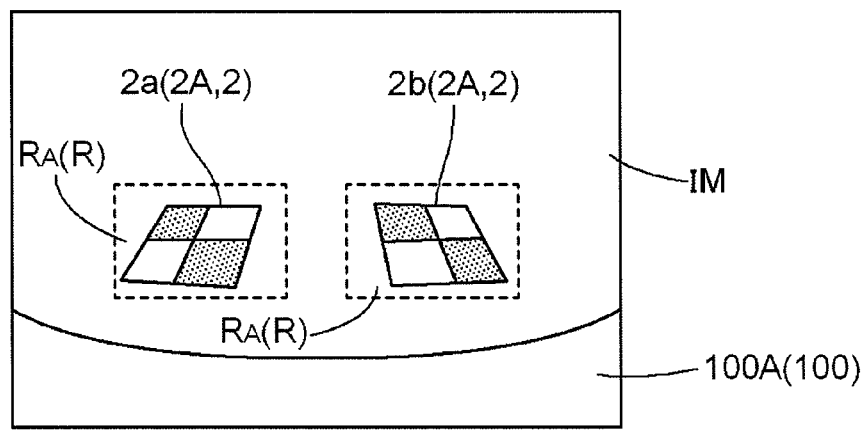
FIG. 4A shows an image of the markers for the calibration, which is taken by a camera mounted on the vehicle.
Figure 4B:
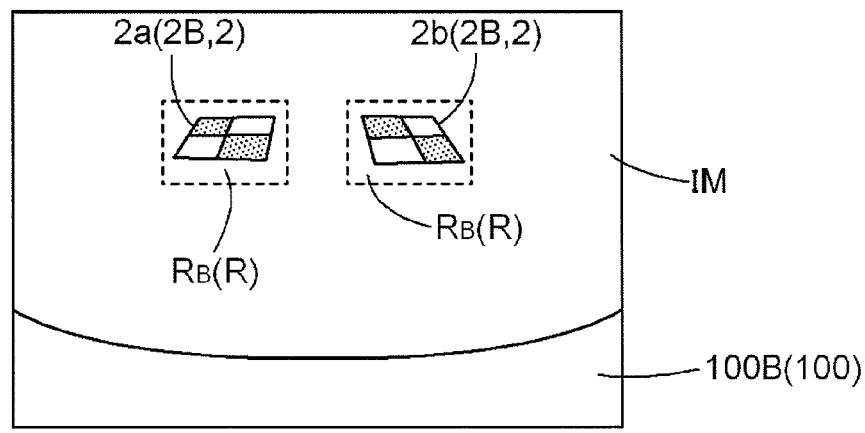
FIG. 4B shows the image of the markers for the calibration, which is taken by the camera mounted on the vehicle having different overall vehicle length from that of the vehicle in FIG. 4A.

As described above, the calibration of the camera 1 is performed in the state where the vehicle 100 is parked in the predetermined position. In order to accurately calibrate the camera 1, it is inevitable to accurately park the vehicle 100 in the predetermined position. In the vehicle assembly plant or the repair shop, a front end of the vehicle 100 is detected by a phototube to have the vehicle 100 parked with a high accuracy. In the meantime, the camera 100 may be mounted on various vehicle models. Since an overall vehicle length varies depending on the vehicle model, a distance between the camera 1 and the marker 2 also varies when the vehicle 100 is parked in a manner that the front end of the vehicle 100 is aligned with a base line provided on the floor. As shown in FIGS. 3, 4A and 4B, an image IM that is taken by the camera 1 mounted on the vehicle 100A so as to include the corresponding marker 2 in a range of view of the camera 1 and the image IM that is taken by the camera 1 mounted on the vehicle 100B so as to include the corresponding marker 2 in the range of view of the camera 1 differ from each other even though the corresponding marker 2 is positioned on the same coordinates in the world coordinate system.

To detect the calibration point Q of the marker 2, the image processing is performed on a capture region R. The capture region R is obtained by cutting a part of the image IM in order to reduce a calculation load for the image processing. When a distance $D_A$ between the vehicle 100A and the marker 2 is shorter as shown in FIG. 3, the corresponding marker 2 appears larger on the image IM as shown in FIG. 4A, accordingly, a capture region $R_A(R)$ is larger. On the other hand, when a distance $D_B$ between the vehicle 100B and the marker 2 is longer as shown in FIG. 3, the corresponding marker 2 appears smaller on the image IM as shown in FIG. 4B, accordingly, a capture region $R_B(R)$ is smaller.

Although only the overall vehicle length of the vehicle 100 is focused on in the example shown in FIGS. 3, 4A and 4B, a vehicle height, then an installation height of the camera 1, also varies depending on the vehicle models, which may result in varied distances between the camera 1 and the marker 2. When the vehicle 100 is parked on a basis of a rear end thereof instead of the front end, an installation position or a direction of the optical axis of the camera 1 also varies depending on the vehicle model because the vehicle height or an angle of a rear panel of the vehicle 100 varies.

Since a position of the marker 2 in the image IM varies depending on the vehicle model as described above, a position and a range of the capture region R need to be set in a calibration device for each vehicle model. Also, size of the marker 2 in the image IM varies depending on the position of the marker 2 in the image IM, and thus the number of pixels contained in the capture region R varies. In other words, the area of the capture region R defined in the image IM is affected and changed by three-dimensional factors related to changes in the height of the camera 1, in an angle of the optical axis of the camera 1 and in the distance between the marker 2 and the vehicle 100. Consequently, the image processing for detecting the calibration point Q requires an appropriate tuning for each vehicle model, thereby increasing complexity of software. Further, a detection performance of the calibration point Q is affected by the changes in the area of the capture region R, making it difficult to obtain stable detection accuracy. However, when the position of the marker 2 is changed for each vehicle model in order to set the same capture region R, settings made in the vehicle assembly plant need to be changed for each vehicle model, thereby considerably decreasing productivity.

Figure 5:
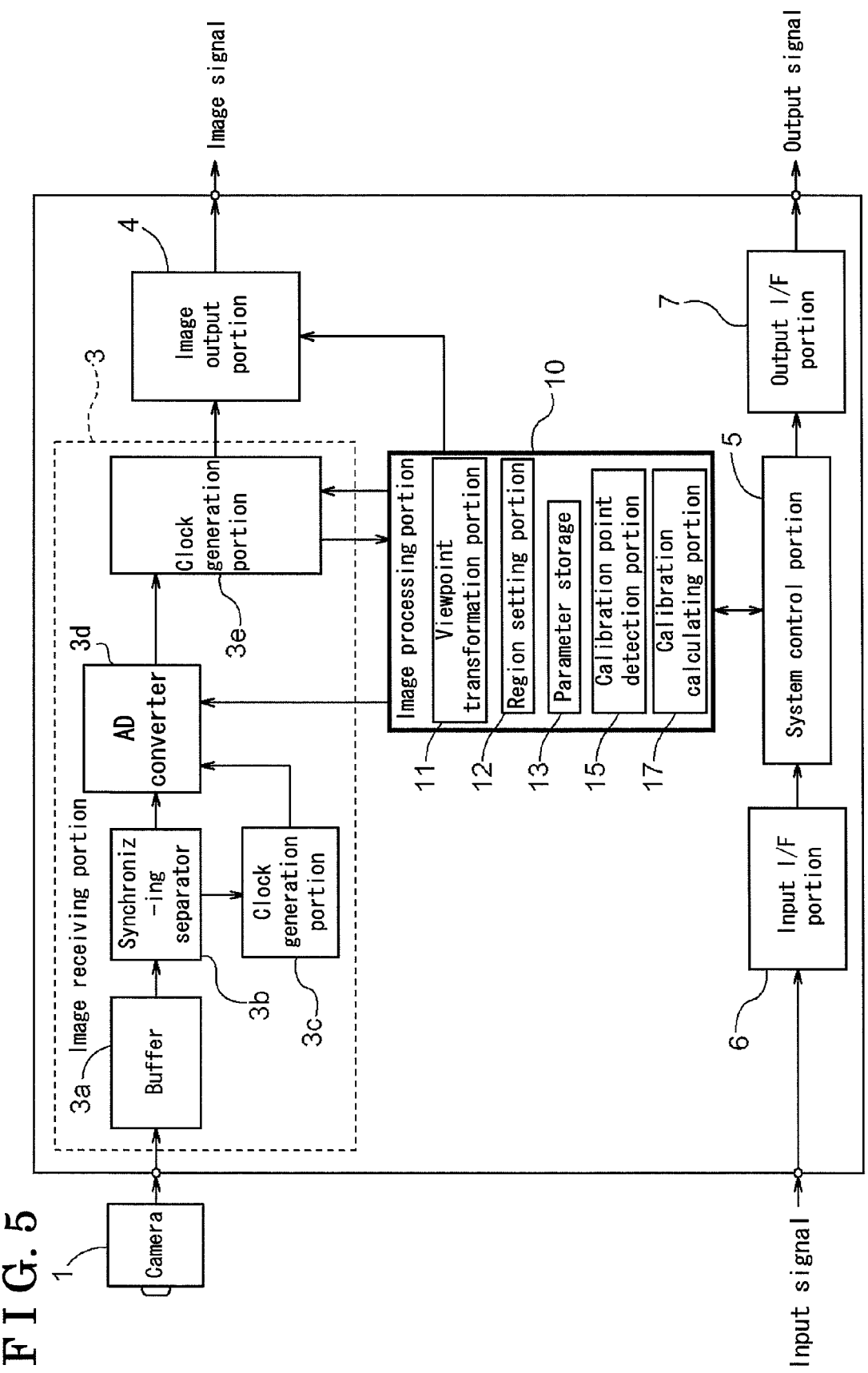
FIG. 5 is a schematic block diagram showing a structure of a calibration device for the on-vehicle camera of this embodiment.

According to this embodiment, the calibration device for the on-vehicle camera includes a structure that reduces diversity of the tuning that has to be otherwise made for each vehicle model and provides a high versatility of the calibration. As shown in FIG. 5, the calibration device for the on-vehicle camera includes an image receiving portion 3, an image output portion 4, a system control portion 5, an input I/F portion 6, an output I/F portion 7 and an image processing portion 10. In this embodiment, these portions are provided separately from one another for convenience of allotment of functions, but these portions do not need to be provided as individual portions dependent of one another. The functions may be achieved in cooperation between hardware including a microcomputer, and program ran on the hardware.

The input I/F portion 6 receives an input signal including an instruction to initiate the calibration of the camera 1 from a host system and transmit the instruction to the system control portion 5. Here, the host system includes an assembly regulation system of the vehicle 100, a rear monitoring system, a navigation system or a multimedia system of the vehicle 100. The system control portion 5 for providing a general control of the calibration device for the on-vehicle camera controls, for example, the image processing portion 10 in accordance with the instruction to initiate the calibration. The output I/F portion 7 receives, for example, an image processing result via the control portion 5, and outputs an electric signal to the host system, a notification portion of the calibration device or the like.

The image receiving portion 3 is a functional portion that receives the image IM taken by the camera 1, which is a digital video camera, via a known image I/F including a buffer 3a, a synchronizing separator 3b, a clock generation portion 3c and an A/D converter 3d, and stores the image IM in a frame memory 3e. An image data control portion provided on the image processing portion 10 controls the image receiving portion 3 by, for example, controlling storage and reading of the image data IM to and from the frame memory 3e. The image processing portion 10 includes a preprocessing portion and corrects levels of density, contrast, shading and the like of the image taken by the camera 1, which attribute to characteristics of a lens of the camera 1.

The image processing portion 10 also includes the functional portions such as a viewpoint transformation portion 11, a region setting portion 12, a parameter storage 13, a calibration point detection portion 15 and a calibration calculating portion 17. Each functional portion will be described in detail here below.

Figure 6:
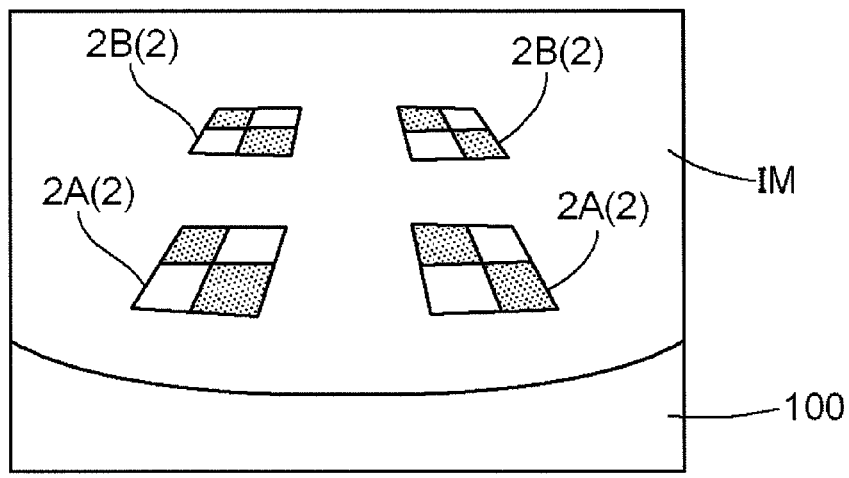
FIG. 6 shows the images in FIGS. 4A and 4B in one view.

The viewpoint transformation portion 11 performs visual transformation on the image IM taken by the camera 1 to obtain a transformed image IM2, IM3 which is the image generated by viewing the image IM from a direction that is perpendicular to the floor surface. As shown in FIG. 6, on the image IM, the size (that is, the number of pixels), a shape and the position of the marker 2A are greatly different from those of the marker 2B. However, as shown FIG. 7, on the transformed image IM2, the size, the shape and the position of the marker 2A are substantially same as those of the marker 2B. Thus, the size of the image that includes therein the marker 2 becomes substantially the same regardless of the distance between the marker 2 and the vehicle 100 after the viewpoint transformation is performed.

As is evident from FIG. 7, after the viewpoint transformation is performed, the pixels unnecessary for the image processing to be performed later are interpolated and reproduced in the periphery of the transformed image IM2. Consequently, a target region $R_0$ that includes therein the marker 2 is defined as a target region for the image processing and is cut from the transformed image IM2 so that the image processing is performed later on the region $R_0$.

The region setting portion 12 sets the capture region R (the recognition target region R) on the transformed image IM2 in accordance with the coordinates of the marker 2 set according to the vehicle model on which the camera 1 is mounted. The parameter storage 13 is the functional portion that stores parameters related to information of the vehicle model including the overall vehicle length, the installation height of the camera 1 and the like according to the vehicle model. The system control portion 5 receives the information of the vehicle model via the input I/F portion 6 and controls the image processing portion 10. On a basis of the received information of the vehicle model, the image processing portion 10 reads out from the parameter storage 13 the appropriate coordinates of the marker 2 set according to the vehicle model, and causes the capture region R to be set in the region setting portion 12.

Figure 7:
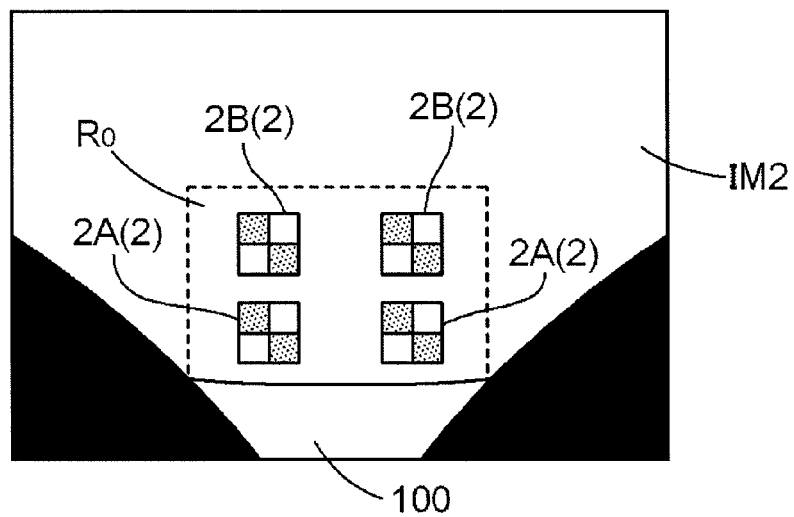
FIG. 7 shows a transformed image after a viewpoint transformation is performed on the image in FIG. 6
Figure 8:
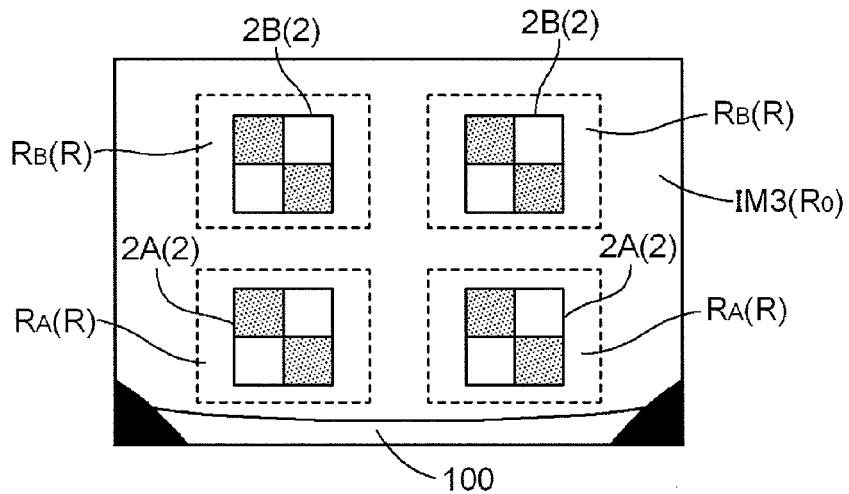
FIG. 8 shows a capture region set in the transformed image shown in FIG. 7.

As described above, the capture region R is set in the target region $R_0$ cut from the transformed image IM2 as shown in FIGS. 7 and 8.

As shown in FIG. 8, on the transformed image IM3, the capture region $R_A$ obtained from the image IM taken by the camera 1 mounted on the vehicle 100A and the capture region $R_B$ obtained from the image IM taken by the camera 1 mounted on the vehicle 100B are of the same size. This allows, in the region setting portion 12, the capture region R to be set in the same size on the transformed image IM3 in consideration only of the coordinates of the marker 2 set according to the vehicle model. Since the capture region R of the same size contains the same number of pixels, the calibration point Q is detected by performing the same image processing. Consequently, there is no need to change the software (program) for each vehicle model, and thus the productivity of vehicle manufacturing is improved.

The capture region R is set with some margin of the position and the area considering an installation error of the camera 1. For example, the margin allows the capture region R to include the marker 2 even when the optical axis of the camera 1 is misaligned by 3 to 5 degrees in the pan, roll and tilt angles respectively. Therefore, by increasing the margin to an extent which absorbs the difference, including the overall vehicle length, the vehicle height, the installation height of the camera 1 among the vehicle models, types of the parameters stored in the parameter storage 13 are reduced, and thus the number of types of the capture region R is reduced. The calculation load in the region setting portion 12 is alleviated in this way, and thus the versatility of the calibration device for various vehicle models is further enhanced, which improves the productivity of the vehicle production.

Figure 9:
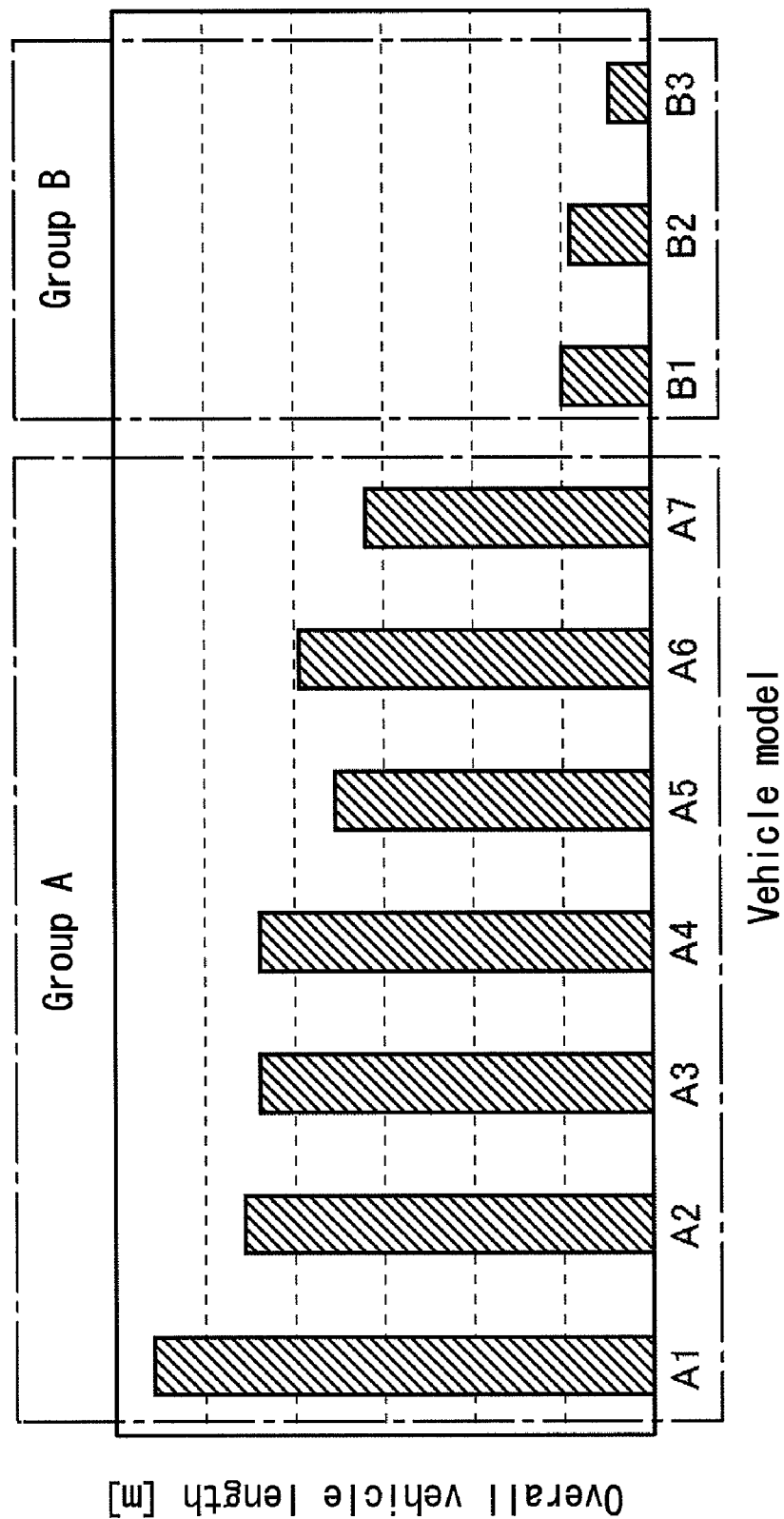
FIG. 9 is a chart showing a difference in the overall vehicle lengths of various vehicle models.

As is evident from the chart shown in FIG. 9, values of the overall vehicle length are classified into, for example, the two groups even when 10 different models of vehicles are produced. That is, in this example, the capture region $R_A$ may be set with the margin for absorbing the difference among the vehicle models belonging to Group A. Similarly the capture region $R_B$ may be set with the margin for absorbing the difference among the vehicle models belonging to Group B. In this case, the parameter storage 13 needs only to store two types of parameters to set the capture regions A and B. This is an extreme case and, for example, a vehicle model A1 may establish a first group, vehicle models A2 to A4 and A6 may establish a second group, vehicle models A5 and A7 may establish a third group and vehicle models B1 to B3 may establish a fourth group. This is an example and the capture region R may be unified regardless of the vehicle model by changing the position of the marker 2 depending on the overall vehicle length so that the marker 2 is located in the same position regardless of the vehicle models.

The calibration point detection portion 15 is the functional portion that detects the calibration point Q located in the marker 2 in the capture region R (the recognition target region R). As described above, the marker 2 of this embodiment is the colored target. The calibration point detection portion 15 is structured to include a color-difference transformation portion, a threshold setting portion, a color region determination portion and a boundary detection portion.

The color-difference transformation portion generates color-difference image data by obtaining a blue component value, a red component value and an intensity value by calculating an RGB pixel value of the image IM (=the transformed image IM3: the same applies hereunder) that is sent to the frame memory 3e for storage as RGB image data. For example, to perform the color-difference transformation, the following mathematical expressions may be applied, which are the mathematical expressions used for transforming the RGB color system into the Y Cb Cr color system, $Y=0.299 \times R+0.587 \times G+0.114 \times B$ $Cb=0.564 \times (B-Y)$ $Cr=0.713 \times (R-Y)$ Here, Y is an intensity value, Cb is a blue component value, Cr is a red component value, R is an R pixel value, G is a G pixel value, and B is a B pixel value. It is understood from the mathematical expressions, that a first color component value and a second color component value, which are for example the blue component value Cb and the red component value Cr, change with intensity (brightness) of the image IM.

Figure 10A:
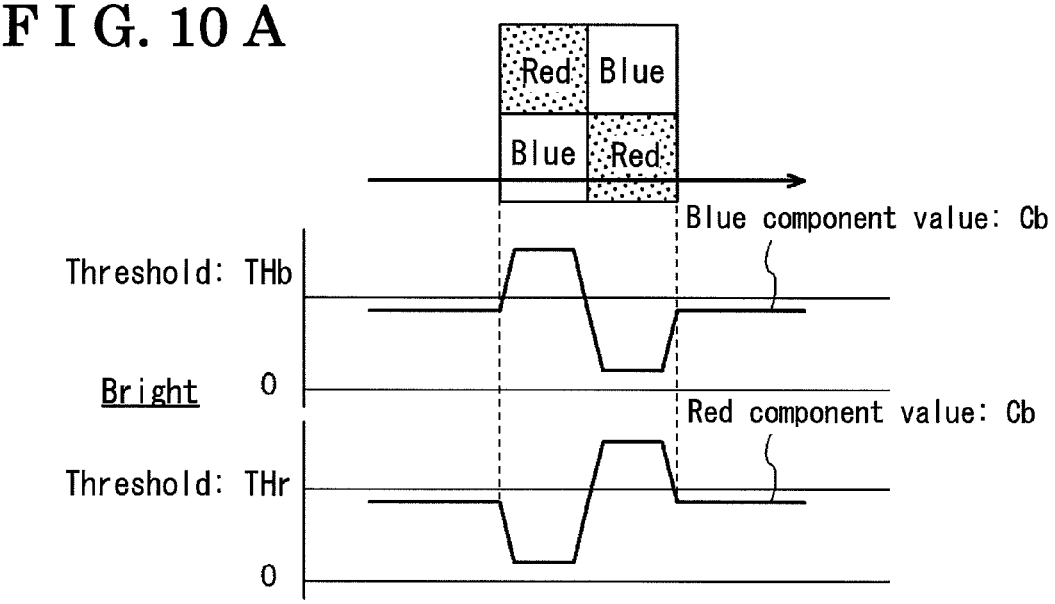
FIG. 10A shows variations of a blue component value: Cb and a red component value: Cr when a color-difference image including therein the marker is laterally scanned (under bright environmental lighting conditions)
Figure 10B:
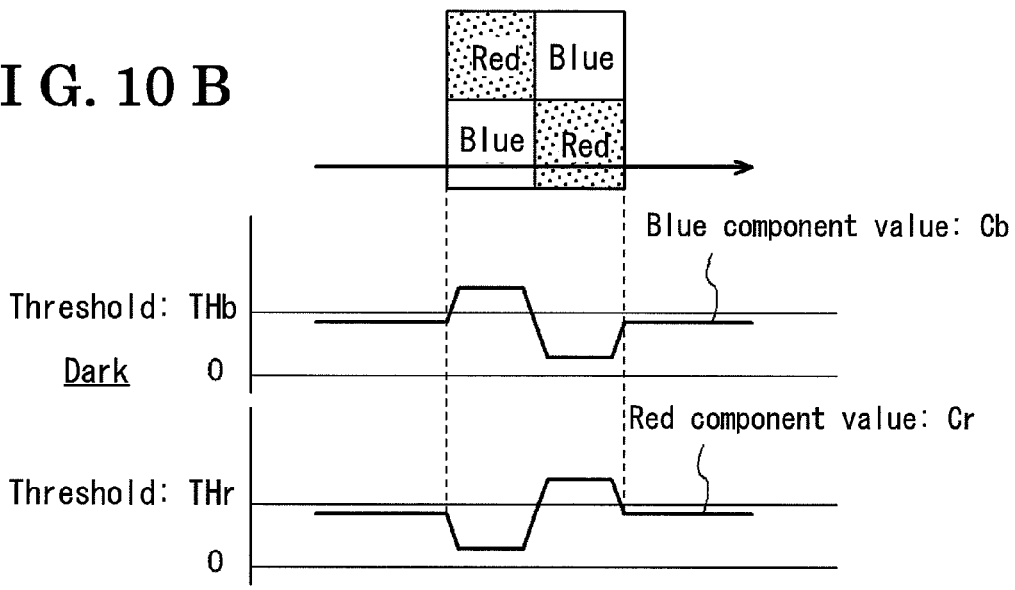
FIG. 10B shows the variations of the blue component value: Cb and the red component value: Cr when the color-difference image including therein the marker is laterally scanned (under dark environmental lighting conditions)

The threshold setting portion sets, as a determining condition, threshold of specific colors for determining whether a target pixel (the target region) is red or blue on a basis of the intensity value (Y) included in the color-difference image data generated in the color-difference transformation portion. The blue component value and the red component value of the Y Cb Cr color system are affected by the intensity value. Therefore, the component values become greater when the image IM is brighter and the component values become smaller when the image IM is darker. As shown in FIG. 10A, the intensity value: Y of the image IM taken under a bright environmental lighting condition is relatively large, consequently the blue component value: Cb and the red component value Cr are also relatively large. As shown in FIG. 10B, the intensity value: Y of the image IM taken under a dark environmental lighting condition is relatively small, consequently the blue component value Cb and the red component value Cr are also relatively small. Consequently, in order to accurately detect a blue region or a red region of the marker 2 from the color-difference image data, levels of the threshold (THb, THr), serving as the detection conditions, may be relatively high when the intensity value is large (that is, the image IM is taken under the bright environmental lighting condition) as shown in FIG. 10A and relatively low when the intensity value is small (that is, the image IM is taken under the dark environmental lighting conditions) as shown in FIG. 10B.

Figure 11:
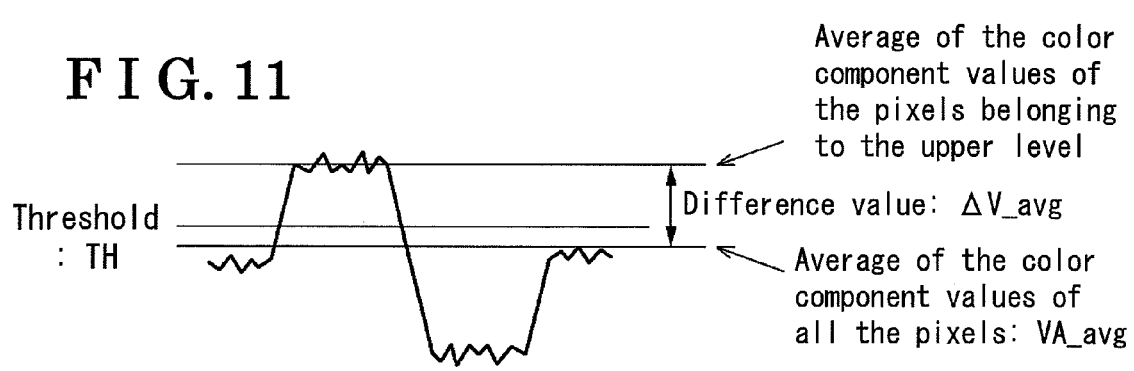
FIG. 11 shows results of a scan performed on the image of the Y Cb Cr color system.

One of the preferable ways to dynamically and variably specify the threshold TH (THb, THr), that is, to vary the level of the threshold, will be described with reference to the schematic view of FIG. 11. The threshold TH (THb, THr) is provided for determining which specific color region (a blue color region or a red color region in this embodiment) the pixel of the image IM belongs to, and is derived from a mathematical expression mentioned below. Here, VA_avg refers to an average of the color component values of all the pixels that are contained in the image IM (the transformed image IM3) and are subject to the determination. VH_avg refers to an average of the color component values of the pixels, out of all the pixels that are contained in the image IM, that belong to an upper level (for example, the pixels whose color component value is 95% or more of the highest color component value). The highest color component value refers to the highest value of the specific color component values that are subject to the determination. $\Delta V\_avg$ (=VH_avg−VA_avg) refers to a difference value between the VA_avg and the VH_avg.

$$TH=VA\_avg+K\times \Delta V\_avg$$

Here, K is a fixed value experimentally obtained beforehand.

The threshold TH calculated in the above-stated method is large when the intensity level of the image IM is high and the threshold TH is small when the intensity level of the image IM is low. This is because the threshold TH is derived by a function whose parameter is the blue component value: Cb or the red component value: Cr, each of which includes a component of the intensity of the image IM. The calculation for deriving the threshold TH may be simplified by calculating either one of the threshold of the blue color THb and the threshold of the red color THr, and then commonly applying the calculated threshold as both THb and THr.

In addition to the above-described methods, various calculation methods for dynamically varying the threshold in accordance with the brightness of the image IM (the intensity level) are considered, whose general concept may be described as follows. For example, the threshold of the blue color THb is derived by a function Fb whose parameters are either one of the intensity value Y of the image IM and a statistical value f(Y) of the intensity value of color-difference information, and the statistical value f (Cb) of the blue component value Cb. The statistical value refers to, for example, a mean value, a median value and the like. The threshold of the red color THr is derived by a function Fr whose parameters are either one of the intensity value Y of the image IM and the statistical value f (Y) of the intensity value of the color-difference information, and the statistical value f(Cr) of the red component value Cr. The function Fb and the function Fr are stated below.

$$THb=Fb(Y,f(Cb)) \text{ or } THb=Fb(f(Y),f(Cb))$$

$$THr=Fr(Y,f(Cr)) \text{ or } THr=Fr(f(Y),f(Cr))$$

Here, the threshold: THb for determining the blue region and the threshold THr for determining the red region are calculated, however, either one of them may be commonly used.

The color region determination portion sequentially scans the color-difference image including therein the marker 2, in accordance with the threshold dynamically set in the threshold setting portion, that is, the threshold set for each image IM, and determines the blue region and the red region. At this time, an AND condition is set as the determination condition for determining the blue region where the blue component value exceeds the threshold and the red component value is below the threshold. Similarly, another AND condition is set as the determination condition for determining the red region where the red component value exceeds the threshold and the blue component value is below the threshold. This is because the blue component value and the red component value are in an opposite relation from each other in terms of a color-difference signal, therefore, the blue region is more accurately determined by using difference between the blue component value and the red component value. However, in this embodiment, the determination condition is not limited to the AND conditions where either one of the color component values exceeds the corresponding threshold and the other one of the color component values is below the corresponding threshold. As the condition for determining the blue region, only the blue component value may exceed the threshold. Alternatively, as the condition for determining the red region, only the red component value may exceed the threshold. The point in this method is that the condition for determining the specific color region is changed by utilizing the intensity information of the image IM.

When the marker 2 includes the rectangles having the black and white checkered pattern instead of the colored checkered pattern, an algorithm employing characteristics of the colors may not be applied. Therefore, a known edge detection algorithm and a known linear recognition algorithm described, for example, in JP2008-131250A (Reference 1) may be applied to detect the boundary in order to detect the calibration point Q. In any cases, a stable detection of the calibration point Q is achieved by setting the capture region R in a simple way under the unified condition.

In order to calibrate the camera 1, a rotational displacement of the camera 1 is calculated in the calibration calculating portion 17 in accordance with the coordinates of the calibration point Q in the reference coordinate system and the coordinates of the calibration point Q in the camera coordinate system. The coordinates of the calibration point Q in the reference coordinate system indicate a position of the calibration point Q in a space and the coordinates of the calibration point Q in the camera coordinate system indicate a position of the calibration point Q detected on the transformed image IM3. For example, a rotation vector is derived in accordance with the calculated rotational displacement, and the image IM is corrected in accordance with the derived rotation vector or an inverse vector of the derived rotation vector. The corrected image is the same as the image taken by the camera 1 mounted in conformity to a design value. For methods for calculating the rotational displacement of the camera 1 and the rotational vector, a known method described in JP 2008-131250 or the like may be applied, and therefore, detailed description is omitted.

Figure 12A:
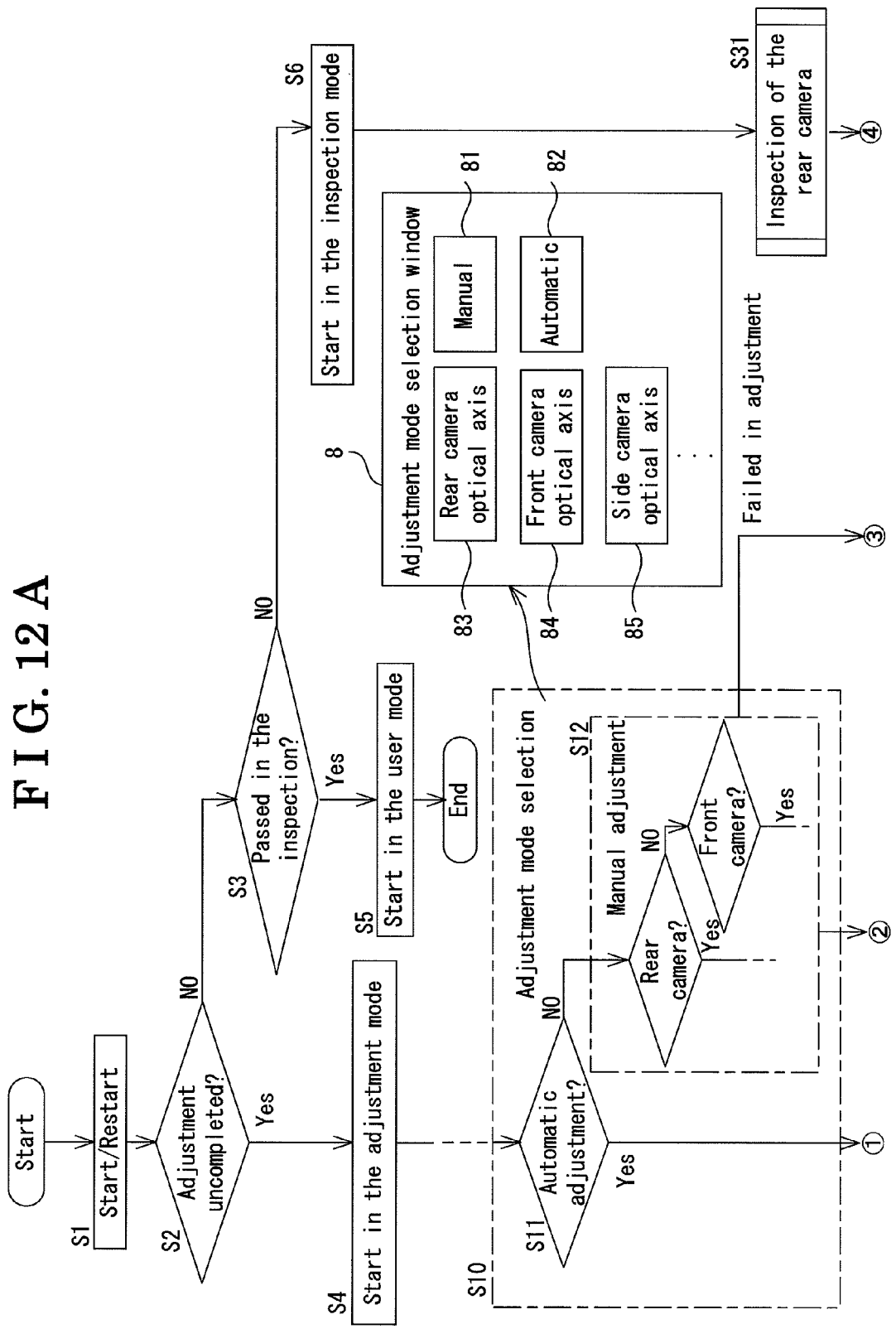
FIG. 12 shows a flowchart of a production process of vehicles, where the calibration device for the on-vehicle camera of this embodiment is applied.
Figure 12B:
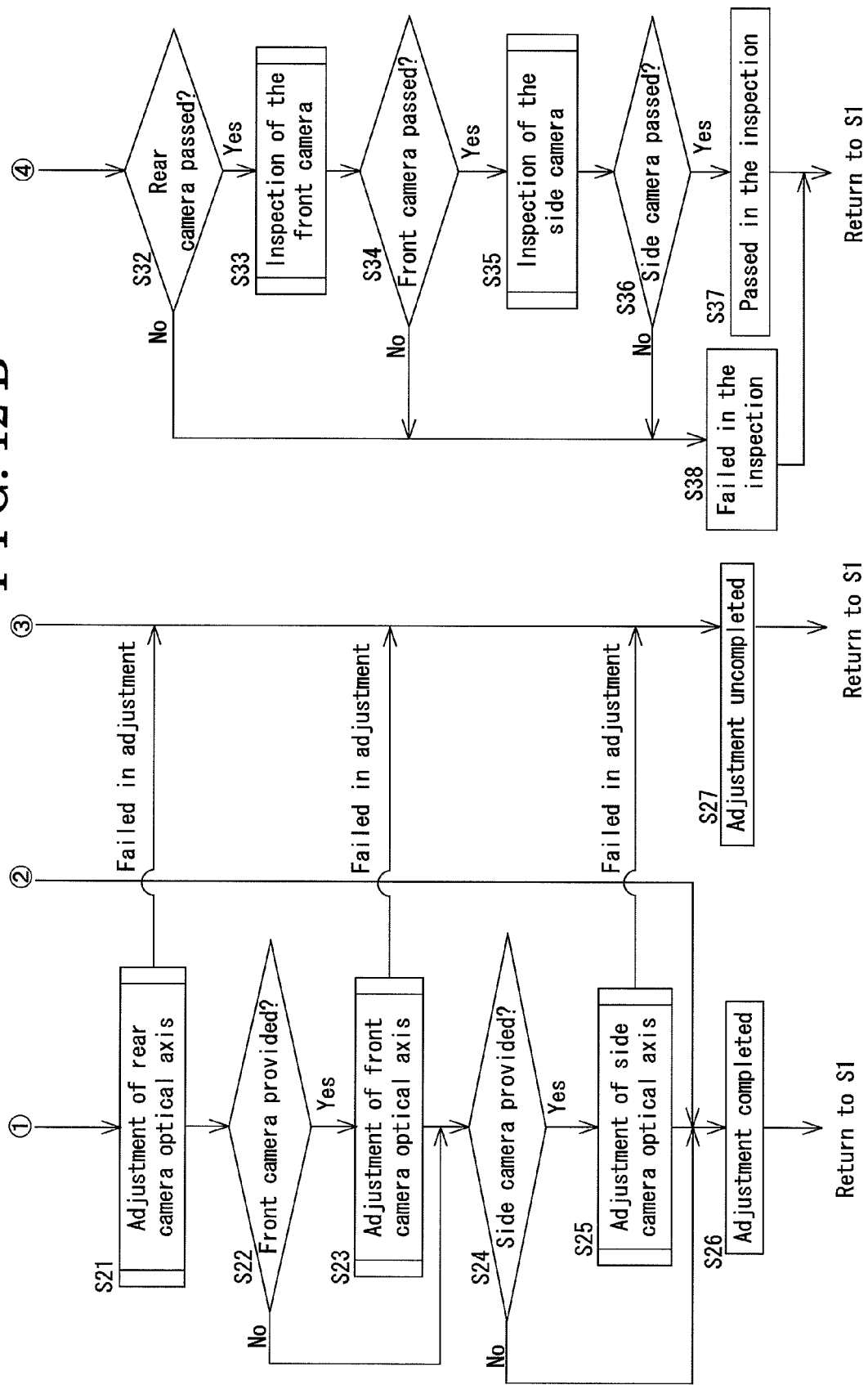

The vehicle produced according to a production process shown in the flowchart of FIG. 12 is provided at least with a rear camera taking the image of the rear area of the vehicle, and the multimedia system having multiple functions such as the rear monitoring system. The rear monitoring system allows the image taken by the rear camera to be displayed on a screen provided on the navigation system or the like. Here, the multimedia system refers to a system having the multiple functions such as an audio-visual function and a navigation function. The multimedia system of this embodiment is provided with, for example, a parking assistance system that performs the image processing on the image taken by the rear camera and conducts a parking assistance. Described here as an example is the multimedia system which calibrates (adjusts) the on-vehicle camera, including the rear monitor camera, inspects performance of the rear monitoring system or the parking assistance system according to the image taken by the corrected (adjusted) on-vehicle camera, and then is started up in a user mode when the inspection is completed.

When an ignition of the vehicle is turned on, the multimedia system is started (S1). The multimedia system may be restarted by a predetermined operation, or alternatively, a program may cause the multimedia system to be prompted to start after completion of calibration steps or inspection steps (S1). When the multimedia system is started or restarted, it is determined whether or not the adjustment of the on-vehicle camera is completed (S2). There are three modes of start-up of the multimedia system, namely, an adjustment mode, an inspection mode and the user mode. In the adjustment mode, the on-vehicle camera is adjusted (calibrated). In the inspection mode, the functions of the rear monitoring system and the parking assistance system are inspected by using the adjusted (calibrated) on-vehicle camera. The adjustment mode and the inspection mode are used in the vehicle assembly plant or the repair shop. The user mode is used by general users, that is, the multimedia system is started in the user mode when the user uses a navigation system, an audio-visual system, the rear monitoring system, the parking assistance system or the like. When it is determined in S2 that the adjustment is not completed, the multimedia system is started in the adjustment mode (S4).

When the multimedia system is started in the adjustment mode, an adjustment mode selection window 8 is displayed on the screen. The screen is structured to have a touch panel, and an adjustment function is selected by touching one of touch buttons 81 to 85 displayed on the screen. For example, by touching the touch button 81, a manual mode is selected where a manual adjustment is performed as described in S12. By touching the touch button 82, an automatic mode is selected where an automatic adjustment is performed as described in S21 to S26. When the vehicle is provided with multiple on-vehicle cameras, for example, a front camera or a side camera in addition to the rear camera, the camera to be manually adjusted is selected by touching an appropriate button from among the touch buttons 83 to 85. The front camera refers to the camera taking an image of a front area of the vehicle and the side camera refers to the camera mounted on a door mirror or the like for taking an image of a lateral area of the vehicle. The adjustment (calibration) of the optical axis of the rear camera is selected by touching the touch button 83, the adjustment (calibration) of the optical axis of the front camera is selected by touching the touch button 84, and the adjustment (calibration) of the optical axis of the side camera is selected by touching the touch button 85.

In the adjustment mode, it is determined whether or not the automatic adjustment mode is selected (S11). When the automatic adjustment mode is selected, first, the optical axis of the rear camera is adjusted in this embodiment (S21). The automatic adjustment ends as "adjustment uncompleted" (S27) when the adjustment of the optical axis fails, that is, when the optical axis is largely misaligned, and therefore a predetermined region does not include therein the calibration point Q even though the calibration was performed according to the rotational displacement of the camera 1 calculated in the above-described method. The failed calibration also includes, a so-called timeout, where time for calculation exceeds a predetermined time. This is because, in these cases, a possibility is high that the adjustment fails even though the adjustment is continued to succeeding steps.

After the adjustment of the optical axis of the rear camera is successfully completed, it is determined whether or not the vehicle is provided with the front camera (S22). When the vehicle is provided with the front camera, the optical axis of the front camera is adjusted (S23). Similarly to the adjustment of the rear camera, the automatic adjustment ends as "adjustment uncompleted" (S27) when the adjustment of the optical axis fails. When the vehicle is not provided with the front camera, it is determined whether or not the vehicle is provided with the side camera (S24). When the vehicle is provided with the side camera, the optical axis of the side camera is adjusted (S25). Similarly to the adjustment of the rear camera, the automatic adjustment ends as "adjustment uncompleted" (S27) when the adjustment of the optical axis fails.

When the adjustment of the optical axes of all the cameras mounted on the vehicle is completed, the automatic adjustment ends as "adjustment completed" (S26). Similarly to the automatic adjustment, when the manual adjustment is attempted and the adjustment is not made, the manual adjustment mode ends as "adjustment uncompleted" (S27). When the manual adjustment is successfully completed, the manual adjustment mode ends as "adjustment completed" (S26). When the adjustment mode ends, a sequence returns to S1 and the multimedia system is restarted. The program may cause the sequence to return to S2 without restarting the multimedia system.

When the adjustment mode ends as "adjustment completed", it is determined whether or not the on-vehicle camera has passed the inspection (S3). In this embodiment, the on-vehicle camera has not been inspected at this point, that is, has not passed the inspection, and thus the multimedia system is started in the inspection mode (S6). By determining whether or not the on-vehicle camera has passed the inspection as described above, it is avoided that the vehicle is delivered to the user without completing the inspection. In a known production process similar to that of this embodiment, the inspection mode is initiated by touching the touch panel after the multimedia system is started in the user mode. In the inspection mode, situations of actual use of the on-vehicle camera by the user are inspected, and therefore it is considered to be appropriate that the inspection mode is initiated after the multimedia system is started in the user mode. The situations to be inspected include, for example, whether or not the rear monitor is actuated and the predetermined region of the image is correctly displayed on the screen when a shift lever is shifted to a reverse range. However, in the known production process, the vehicle might be delivered to the user without completing the inspection. This is satisfactorily avoided by employing a determination step performed in S3.

In this embodiment, when the multimedia system is started in the inspection mode, the inspection of the rear camera is conducted first (S31). The inspection of the rear camera includes, for example, the inspection of the region of the image displayed on the screen as described above and a position of a guideline displayed on the screen related to the parking assistance system. In many cases, an operator visually confirms that the guideline displayed on the screen matches an indicator provided in the assembly plant. When the rear camera passes the inspection, the operator touches a touch button corresponding to "pass" on the touch panel to complete the inspection of the rear camera. When the rear camera fails in the inspection, the operator touches a touch button corresponding to "fail" on the touch panel to complete the inspection of the rear camera. Conventionally, when the rear camera is adjusted but fails in the inspection, no record is kept on the vehicle (a product) to indicate that the rear camera has failed in the inspection, which makes it difficult to distinguish failed products from passed products. The above-mentioned case where "the on-vehicle camera is adjusted but fails in the inspection" may frequently occur in the plant or the repair shop where the adjustment is automatically conducted but the inspection is conducted by the operator. However, according to this embodiment, by touching the touch button corresponding to "pass" or the touch button corresponding to "fail" after the inspection is completed, the above-mentioned problem is avoided.

When the inspection of the rear camera is completed, a determination of pass or fail is made (S32). The sequence moves to the inspection of another camera when the rear camera passes the inspection. The inspection mode ends as "failed in inspection" when the rear camera fails the inspection (S38). In this embodiment, the inspection of the front camera is conducted (S33) when the rear camera passes in the inspection. When the inspection of the front camera is completed in the similar way, the determination of pass or fail is made (S34). The inspection mode ends as "failed in inspection" (S38) when the front camera fails the inspection, and the sequence moves to the inspection of the side camera (S35) when the front camera passes the inspection. When the inspection of the side camera is completed, the determination of pass or fail is made (S36). When the side camera passes the inspection, the inspection mode ends as "passed in inspection" (S37) because all the on-vehicle cameras passed the inspection according to this embodiment. When the side camera fails in the inspection, the inspection mode ends as "failed in inspection" (S38).

When the inspection mode ends, the sequence returns to S1 again and the multimedia system is restarted. The program may cause the sequence to return to S2 or S3 without restarting the multimedia system. When the inspection mode ends as "passed in inspection", the multimedia system is started in the user mode (S5) after undergoing S2 and S3. The multimedia system is always started in the user mode at this and later start-up because both adjustment (calibration) and the inspection are completed.

By conducting the adjustment (calibration) and the inspection in accordance with the above-stated sequences, the adjustment and the inspection are reliably completed on the on-vehicle cameras. That is, even when the assembly plant is temporary shut down and then resumes operation, the adjustment and the inspections are reliably completed on the on-vehicle camera that were in the middle of the adjustment steps or the inspection steps at the time of the shut-down. As a result, it is avoided that the vehicle that has insufficiently adjusted or inspected is delivered to the user.

As described above, the calibration device for the on-vehicle camera of this embodiment reduces the diversity of the tuning that has to be otherwise made for each vehicle model and provides the high versatility of the calibration.

According to the embodiment, the calibration device for the on-vehicle camera includes the image receiving portion 3 receiving the image IM of an area around the vehicle 100 taken by the camera 1 mounted on the vehicle 100, where the camera 1 has an imaging range that includes therein the marker 2 placed on the floor surface and the vehicle 100 is parked on the floor surface on which the calibration index 2 is placed. The calibration device further includes the viewpoint transformation portion 11 performing the viewpoint transformation on the image IM to obtain the transformed image IM2, IM3, where the transformed image IM2, IM3 is obtained by viewing the image IM from the direction that is perpendicular to the floor surface, and the region setting portion 12 setting the capture region R on the transformed image IM2, IM3 according to the coordinates of the marker 2 set in accordance with the vehicle models on which the camera 1 is mounted, where the capture region R includes therein the marker 2. The calibration device still further includes the calibration point detecting portion 15 detecting the calibration point Q positioned within the marker 2 included in the capture region R, and the calibration calculating portion 17 calibrating the camera 1 in accordance with the coordinates of the calibration point Q in the reference coordinate system and in accordance with the coordinates of the calibration point Q in the camera coordinate system, where the coordinates of the calibration point Q in the reference coordinate system show the position of the calibration point Q in the space and the coordinates of the calibration point Q in the camera coordinate system show the position of the calibration point Q detected on the transformed image IM2, IM3.

Due to the above-described structure, the viewpoint transformation is performed on the image IM to obtain the transformed image IM2, IM3. The transformed image IM2, IM3 are the images obtained by viewing the image IM from the direction that is perpendicular to the floor surface. Therefore the size, the shape and the position of the marker 2 on the transformed image IM2, IM3 are substantially constant regardless of the distance between the marker 2 and the camera 1. Consequently, the on-vehicle camera is calibrated by performing the same image processing on the transformed image IM2, IM3 even when the distance between the marker 2 and the camera 1 varies depending on the vehicle model. As a result, according to this embodiment, the calibration device for the on-vehicle camera reduces the diversity of the tuning that shall be otherwise made for each vehicle model and provides the high versatility of the calibration. In addition, a stable image processing, that is, a stable calibration is provided, thereby improving quality of the vehicle 100 produced.

According to the embodiment, the region setting portion 12 sets the capture region R on the transformed image IM2, IM3 so that the marker 2 has the same shape on the transformed image IM2, IM3 regardless of the vehicle model on which the camera 1 is mounted.

Due to the above-described structure, the image processing, including the detection of the calibration point Q, is performed on the region having the same shape regardless of the vehicle model. Consequently, the same image processing is commonly used regardless of the vehicle model. As a result, according to this embodiment, the calibration device for the on-vehicle reduces the diversity of the tuning that shall be otherwise made for each vehicle model and provides the high versatility of the calibration.

According to the embodiment, the region setting portion 12 sets the capture region R on the transformed image IM2, IM3 so that the marker 2 has the same area on the transformed image IM2, IM3 regardless of the vehicle model on which the camera 1 is mounted.

Due to the above-described structure, the image processing, including the detection of the calibration point Q, is performed on the region having the same area regardless of the vehicle model. Consequently, the same image processing is commonly used regardless of the vehicle model. As a result, according to this embodiment, the calibration device for the on-vehicle reduces the diversity of the tuning that shall be otherwise made for each vehicle model and provides the high versatility of the calibration.

According to the embodiment, the region setting portion 12 sets the capture region R on the transformed image IM2, IM3 so that the capture region R is located in the same position on the transformed image IM2, IM3 regardless of the vehicle model on which the camera 1 is mounted.

Due to the above-described structure, the image processing, including the detection of the calibration point Q, is performed on the region positioned in the same position regardless of the vehicle model. Consequently, the same image processing is commonly used regardless of the vehicle model. As a result, according to this embodiment, the calibration device for the on-vehicle reduces the diversity of the tuning that shall be otherwise made for each vehicle model and provides the high versatility of the calibration.

According to the embodiment, the marker 2 has the checkered pattern.

According to the embodiment, the calibration point Q corresponds to the intersecting point of the boundaries defining the checks.

According to the embodiment, the checkered pattern is colored.

According to the embodiment, the marker 2 is positioned so that the coordinates of the marker 2 are known in the reference coordinate system.

According to the embodiment, the marker 2 has the frosted surface appearance.

According to the embodiment, the image IM includes at least two markers 2, 2.

In order to calculate the rotational displacement of the camera 1 in terms of all the directions of the three axes based on the three dimensional Cartesian coordinate system, the coordinates of plurality of calibration points are needed both in the reference coordinate system and in the camera coordinate system. The two markers 2, 2 may be used to detect at least two calibration points Q, Q so that a three-dimensionally balanced calibration is conducted on the camera 1. By allowing the image IM to include therein at least two markers 2, 2, the camera 1 is favorably calibrated in a three dimensional space.

According to the embodiment, the at least two markers 2, 2 are positioned so that the distance therebetween is smaller than the tread width of the vehicle 100 on which the camera 1 is mounted.

According to the embodiment, the at least two markers 2, 2 are positioned so that the distance therebetween is larger than the tread width of the vehicle 100 on which the camera 1 is mounted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A calibration device for an on-vehicle camera, comprising:
    an image receiving portion receiving an image of an area around a vehicle taken by an on-vehicle camera mounted on the vehicle, the on-vehicle camera having an imaging range that includes therein a calibration index placed on a floor surface:
    a viewpoint transformation portion performing a viewpoint transformation on the image to obtain a transformed image, the transformed image being obtained by transforming the viewing of the image (IM) to a direction perpendicular to the floor surface;
    a region setting portion setting a recognition target region on the transformed image according to coordinates of the calibration index set in accordance with vehicle models on which the on-vehicle camera is mounted, the recognition target region including therein the calibration index;
    a calibration point detecting portion detecting a calibration point positioned within the calibration index included in the recognition target region; and
    a calibration calculating portion calibrating the on-vehicle camera in accordance with coordinates of the calibration point in a reference coordinate system and in accordance with coordinates of the calibration point in a camera coordinate system, the coordinates of the calibration point in the reference coordinate system showing a position of the calibration point in space and the coordinates of the calibration point in the camera coordinate system showing the position of the calibration point detected on the transformed image.

2. The calibration device for the on-vehicle camera according to claim 1, wherein the region setting portion sets the recognition target region on the transformed image so that the calibration index has a same shape on the transformed image regardless of the vehicle model on which the on-vehicle camera is mounted.

3. The calibration device for the on-vehicle camera according to claim 1, wherein the region setting portion sets the recognition target region on the transformed image so that the calibration index has a same area on the transformed image regardless of the vehicle model on which the on-vehicle camera is mounted.

4. The calibration device for the on-vehicle camera according to claim 1, wherein the region setting portion sets the recognition target region on the transformed image so that the recognition target region is located in a same position on the transformed image regardless of the vehicle model on which the on-vehicle camera is mounted.

5. The calibration device for the on-vehicle camera according to claim 1, wherein the calibration index has a checkered pattern.

6. The calibration device for the on-vehicle camera according to claim 5, wherein the calibration point corresponds to an intersecting point of boundaries defining checks.

7. The calibration device for the on-vehicle camera according to claim 6, wherein the checkered pattern is colored.

8. The calibration device for the on-vehicle camera according to claim 7, wherein the calibration index is positioned so that the coordinates of the calibration index are known in the reference coordinate system.

9. The calibration device for the on-vehicle camera according to claim 1, wherein the calibration index has a frosted surface appearance.

10. The calibration device for the on-vehicle camera according to claim 1, wherein the image includes at least two calibration indexes.

11. The calibration device for the on-vehicle camera according to claim 10, wherein the at least two calibration indexes are positioned so that a distance therebetween is smaller than a tread width of the vehicle on which the on-vehicle camera is mounted.

12. The calibration device for the on-vehicle camera according to claim 10, wherein the at least two calibration indexes are positioned so that a distance therebetween is larger than a tread width of the vehicle on which the on-vehicle camera is mounted.

* * * * *